(12) United States Patent
Chaudhuri et al.

(10) Patent No.: US 8,879,409 B2
(45) Date of Patent: Nov. 4, 2014

(54) METHOD AND SYSTEM FOR IMPROVING QOS IN A WIRELESS NETWORK

(75) Inventors: Saptarshi Chaudhuri, Bangalore (IN); Subhodeep Sarkar, Kolkata (IN)

(73) Assignee: Wipro Limited, Bangalore (IN)

( * ) Notice: Subject to any disclaimer, the term of this patent is extended or adjusted under 35 U.S.C. 154(b) by 593 days.

(21) Appl. No.: 13/245,921

(22) Filed: Sep. 27, 2011

(65) Prior Publication Data

US 2013/0077503 A1 Mar. 28, 2013

(51) Int. Cl.
*H04W 28/24* (2009.01)
*H04W 76/02* (2009.01)

(52) U.S. Cl.
CPC .......... *H04W 28/24* (2013.01); *H04W 76/022* (2013.01)
USPC ........... 370/252; 370/395.42; 370/412

(58) Field of Classification Search
CPC ............ H04L 47/24; H04L 47/2433; H04L 2012/5651; H04L 49/90; H04W 72/10; H04W 28/24; H04W 76/022
USPC ............. 370/241, 252, 310, 328, 351, 389, 370/395.1, 395.2, 395.21, 395.4, 395.42, 370/412; 455/403, 422.1, 423, 434, 435.1, 455/435.2, 435.3, 39, 500, 507, 509, 512, 455/513
See application file for complete search history.

(56) References Cited

U.S. PATENT DOCUMENTS

| | | | |
|---|---|---|---|
| 6,683,853 B1 * | 1/2004 | Kannas et al. | 370/237 |
| 2004/0037269 A1 * | 2/2004 | Lundin | 370/352 |
| 2007/0253365 A1 | 11/2007 | Hedberg et al. | |
| 2008/0013553 A1 | 1/2008 | Shaheen | |
| 2008/0123660 A1 | 5/2008 | Sammour et al. | |
| 2009/0016282 A1 * | 1/2009 | Gasparroni et al. | 370/329 |
| 2009/0238207 A1 | 9/2009 | Zhao et al. | |
| 2010/0020749 A1 | 1/2010 | Shin et al. | |
| 2010/0034083 A1 | 2/2010 | Prakash et al. | |
| 2010/0054204 A1 | 3/2010 | Dolganow et al. | |
| 2010/0067400 A1 | 3/2010 | Dolganow et al. | |
| 2010/0208614 A1 | 8/2010 | Harmatos | |
| 2010/0265823 A1 | 10/2010 | Zhao et al. | |
| 2010/0296474 A1 * | 11/2010 | Noriega | 370/329 |
| 2011/0044279 A1 * | 2/2011 | Johansson et al. | 370/329 |
| 2011/0069685 A1 | 3/2011 | Tofighbakhsh | |
| 2011/0141890 A1 | 6/2011 | Giaretta et al. | |
| 2011/0159893 A1 | 6/2011 | Siomina et al. | |

FOREIGN PATENT DOCUMENTS

WO 2010123254 A2 10/2010

* cited by examiner

*Primary Examiner* — Obaidul Huq
(74) *Attorney, Agent, or Firm* — LeClairRyan, a Professional Corporation (57) ABSTRACT

A method and system for improving quality of service (QoS) in a wireless network are disclosed. In one embodiment, bearer connection context parameters of each of a plurality of data packets in the wireless network are obtained. Further, general packet radio service tunneling protocol user plane protocol data unit (G-PDU) packets are determined in the plurality of data packets based on first bearer connection context parameters which is a subset of the bearer connection context parameters. Furthermore, the determined G-PDU packets are queued in a non-signaling queue. QoS attributes are then computed for each of the queued G-PDU packets. In addition, priority data is computed for each of the queued G-PDU packets is computed using the computed QoS attributes. Moreover, one or more priority queues are formed based on the computed priority data of each of the queued G-PDU packets for improving QoS in the wireless network.

31 Claims, 8 Drawing Sheets

METHOD AND SYSTEM FOR IMPROVING QOS IN A WIRELESS NETWORK

TECHNICAL FIELD

Embodiments of the present subject matter relate to a wireless network. More particularly, the embodiments of the present subject matter relate to improving quality of service (QoS) in the wireless network.

BACKGROUND

Long term evolution (LTE) network is a standard mobile broadband technology that provides a high speed Internet experience to subscribers (e.g., mobile subscribers). Currently, a rapid increase in number of subscribers and recent emergence of new applications, such as multimedia online gaming (MMOG), mobile television (TV), Web 2.0 and the like have resulted in a large scale increase in data (e.g., mobile data) and bandwidth usage. Due to the rapid increase in the number of subscribers, the data and the bandwidth usage, processing load in the LTE network is increasing which may lead to more traffic congestion, data packet delay and/or data packet loss. Hence, the subscribers' experience is impacted. Also, network operators (e.g., mobile network operators) have to manage high speed data traffic from the increased number of subscribers to improve the subscribers' experience by providing a good quality of service (QoS).

Typically, QoS in the LTE network is defined by parameters, such as a priority, a data packet delay budget and a data packet loss rate. Generally, to provide a good QoS, the LTE network prioritizes data packets associated with applications and services (e.g., mobile services) such that, minimum data packet delay budget and data packet loss rate are ensured. The above mentioned parameters are further associated with a logical connectivity between the LTE network and devices (e.g., mobile devices) of the subscribers. The logical connectivity is of two types, namely default evolved packet service (EPS) bearers and dedicated EPS bearers. Typically, the default EPS bearers and the dedicated EPS bearers are implemented in LTE network elements, such as a packet data network gateway (PDN GW) and a service gateway (SGW) to be compliant with LTE network standards. Further, the devices of the subscribers supporting the default EPS bearers and dedicated EPS bearers will be able to communicate with the LTE network.

However, in the case where the default EPS bearers are used, there is no guaranteed bit rate (GBR) between the devices and the PDN GW/SGW due to lack of prioritization of the data packets or due to preferential treatment of the data packets. As a result, a high priority, low delay application data packet gets the same LTE network treatment as a low priority, high delay application data packet. Also, in the case where the dedicated EPS bearers are used, application data packets are ensured a GBR due to priority processing in the PDN GW/SGW. As a result, the data packets over the default EPS bearers get a de-prioritized treatment in the PDN GW/SGW. This can end up increasing the data packet delay budget and data packet loss rate.

SUMMARY

A method and system for improving quality of service (QoS) in a wireless network are disclosed. According to one aspect of the present subject matter, a plurality of data packets is received from subscribers in the wireless network. Further, bearer connection context parameters of each of the received plurality of data packets in the wireless network are obtained. Furthermore, general packet radio service tunneling protocol user plane protocol data unit (G-PDU) packets are determined in the received plurality of data packets based on first bearer connection context parameters which is a subset of the bearer connection context parameters. The determined G-PDU packets are then queued in a non-signaling queue. QoS attributes are then computed for each of the queued G-PDU packets using throughput parameters and second bearer connection context parameters which is a subset of the bearer connection context parameters of each of the queued G-PDU packets. In addition, priority data is computed for each of the queued G-PDU packets using the computed QoS attributes. Moreover, one or more priority queues are formed based on the computed priority data of each of the queued G-PDU packets for improving QoS in the wireless network. Also, each of the queued G-PDU packets in each of the formed one or more priority queues is scheduled based on third bearer connection context parameters which is the subset of the bearer connection context parameters for further improving the QoS in the wireless network.

According to another aspect of the present subject matter, the system includes a differential QoS evolved packet service (EPS) bearer module. Further, the differential QoS EPS bearer module includes an adder, a system queue including a signaling queue and a non-signaling queue coupled to the adder, an analyzer coupled to the non-signaling queue, and one or more priority queues coupled to the analyzer. Furthermore, the system includes a pre-emption round robin (PERR) scheduler coupled to the one or more priority queues. In addition, the analyzer includes a QoS attributes computation and comparison module and a priority data computation module coupled to the QoS attributes computation and comparison module. Moreover, the system includes a bearer plane (BP) protocol engine coupled to the differential QoS EPS bearer module.

Further, the differential QoS EPS bearer module obtains the bearer connection context parameters of each of the plurality of data packets in the wireless network. Particularly, the BP protocol engine receives the plurality of data packets from subscribers in the wireless network. Furthermore, the adder determines the G-PDU packets in the plurality of data packets based on the first bearer connection context parameters which is the subset of the bearer connection context parameters. In addition, the adder queues the determined G-PDU packets in the non-signaling queue. Moreover, the QoS attributes computation and comparison module computes QoS attributes for each of the queued G-PDU packets using the throughput parameters and the second bearer connection context parameters which is the subset of the bearer connection context parameters of each of the queued G-PDU packets. Also, the priority data computation module computes priority data for each of the queued G-PDU packets using the computed QoS attributes. In one exemplary implementation, the QoS computation and comparison module compares each of the computed QoS attributes with an associated predetermined QoS attribute. Further, the priority data computation module computes the priority for each of the queued G-PDU packets based on the comparison. The analyzer then forms the one or more priority queues based on the computed priority data of each of the queued G-PDU packets for improving QoS in the wireless network. Further, the PERR scheduler schedules each of the queued G-PDU packets in each of the formed one or more priority queues based on the third bearer connection context parameters which is the subset of the bearer connection context parameters for further improving the QoS in the wireless network.

According to yet another aspect of the present subject matter, a non-transitory computer-readable storage medium to improve the QoS in the wireless network, having instructions that, when executed by a computing device causes the computing device to perform the method described above.

The system and method disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present invention in any way.

DETAILED DESCRIPTION

A method and system to improve quality of service (QoS) in a wireless network are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
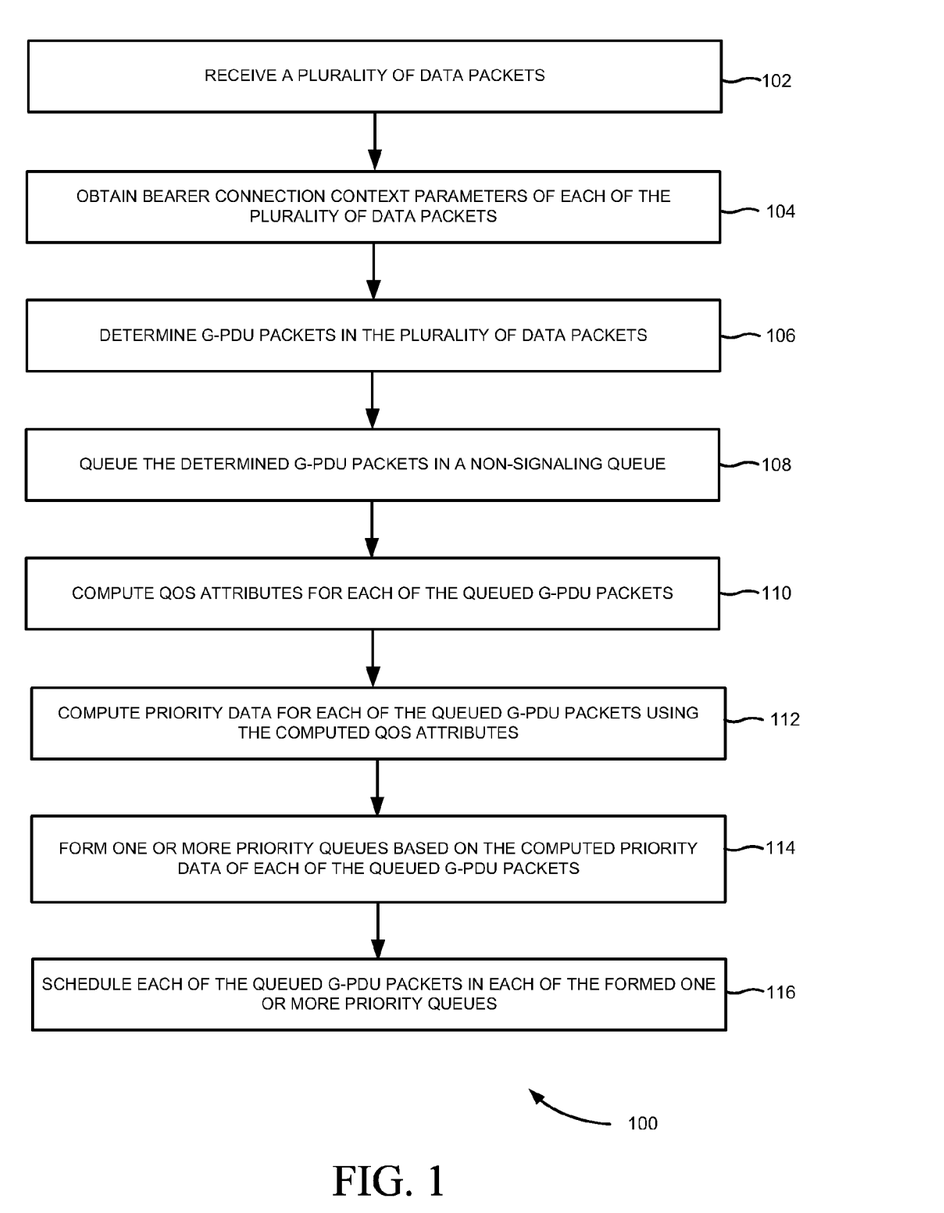
FIG. 1 illustrates a flowchart of a method for improving quality of service (QoS) in a wireless network, according to one embodiment.

FIG. 1 illustrates a flowchart 100 of a method for improving QoS in a wireless network, according to one embodiment. At block 102, a plurality of data packets is received from the wireless network. At block 104, bearer connection context parameters of each of the plurality of data packets are obtained. In this embodiment, the plurality of data packets includes data packets, such as a plurality of default bearer data packets and a plurality of dedicated bearer data packets. The bearer connection context parameters are parameters associated with a logical connectivity between a Long term evolution (LTE) network and devices (e.g., mobile devices) of the subscribers. The logical connectivity is of two types, namely default evolved packet service (EPS) bearers and dedicated EPS bearers. The retrieved bearer connection context parameters includes default bearer connection context parameters and dedicated bearer connection context parameters associated with each of the plurality of default bearer data packets and each of the plurality of dedicated bearer data packets, respectively. For example, the default bearer connection context parameters include parameters, such as a priority level (PL), a pre-emption capability (PCI), a pre-emption vulnerability (PVI), a tunnel end point identifier (TEID), an access point name-aggregate maximum bit rate (APN-AMBR) and the like. Further, the dedicated bearer connection context parameters include parameters, such as the PL, the PCI, the PVI, the TEID, a maximum bit rate (MBR) for uplink, a MBR for downlink, a guaranteed bit rate (GBR) for uplink, a GBR for downlink and the like.

At block 106, general packet radio service tunneling protocol user plane protocol data unit (G-PDU) packets in the received plurality of data packets are determined based on first bearer connection context parameters which is a subset of the bearer connection context parameters. For example, a G-PDU packet includes a transport protocol data unit (T-PDU), such as an Internet protocol (IP) datagram received from the subscriber, a network node in an external packet data network and the like. In one embodiment, the first bearer connection context parameters which is a subset of the bearer connection context parameters include the TEID and the like. At block 108, the determined G-PDU packets are queued in a non-signaling queue. This is explained in more detail with reference to FIG. 6.

At block 110, QoS attributes are computed for each of the queued G-PDU packets using throughput parameters and second bearer connection context parameters which is a subset of the bearer connection context parameters of each of the queued G-PDU packets. The QoS attributes include attributes, such as latency, an average throughput, an aggregate throughput and the like. The throughput parameters include parameters, such as an entry time stamp, an exit timestamp and a size of a transport protocol data unit (T-PDU) of each G-PDU packet. In one embodiment, the second bearer connection context parameters include the PCI, the PL, the APN-AMBR, the GBR for uplink, the GBR for downlink, the MBR for uplink, the MBR for downlink and the like.

At block 112, priority data is computed for each of the queued G-PDU packets using the computed QoS attributes. In one exemplary implementation, each of the computed QoS attributes of each of the queued G-PDU packets is compared with an associated predetermined QoS attribute. Further, the priority data for each of the queued G-PDU packets is computed based on the comparison. At block 114, one or more priority queues are formed based on the computed priority data of each of the queued G-PDU packets for improving QoS in the wireless network. This is explained in more detail with reference to FIG. 7. At block 116, each of the queued G-PDU packets in each of the formed one or more priority queues is scheduled based on third bearer connection context parameters which is a subset of the bearer connection context parameters for further improving the QoS in the wireless network. In one embodiment, the third bearer connection context parameters include the PL, the PCI, the PVI and the like. This is explained in more detail with reference to FIG. 8.

Figure 2:
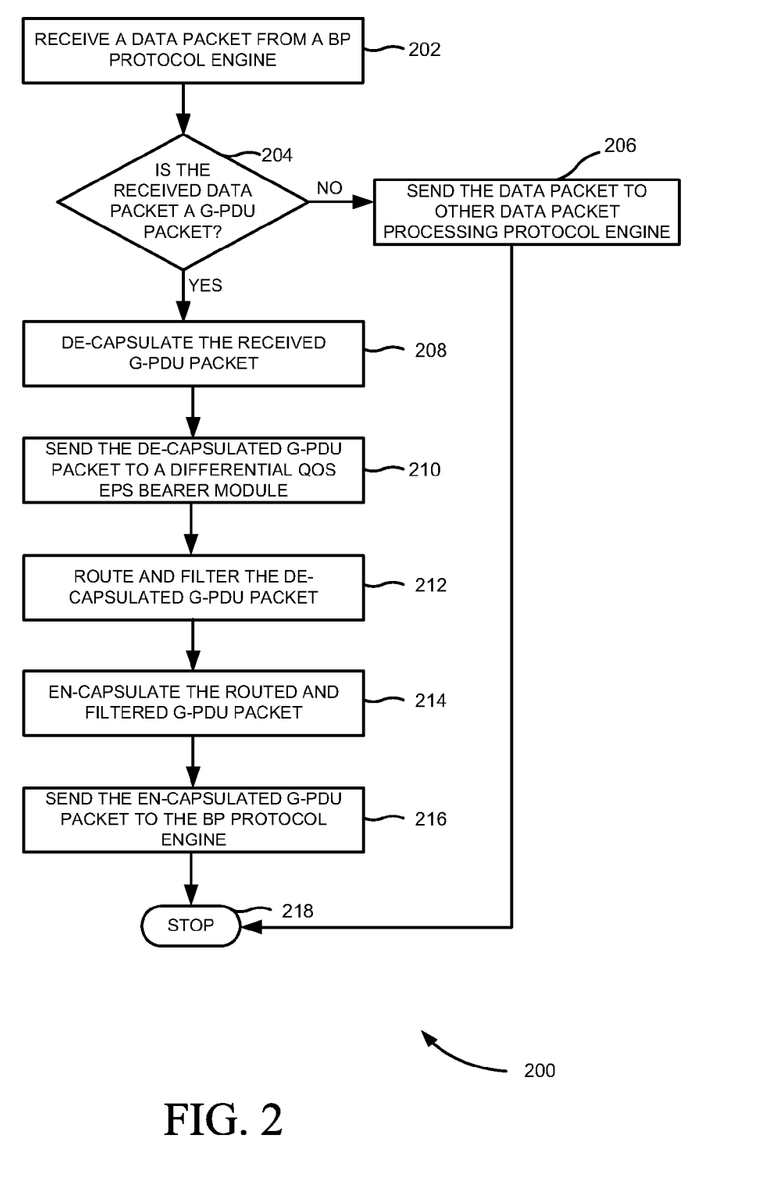
FIG. 2 illustrates another flowchart of a method for improving QoS in the wireless network, according to one embodiment.

Referring now to FIG. 2, which is another flowchart 200 that illustrates a method for improving QoS in a wireless network, according to one embodiment. At block 202, a data packet is received from a bearer plane (BP) protocol engine. At block 204, it is determined whether the received data packet is a G-PDU packet. At block 206, the received data packet is sent to other data packet processing protocol engine if the received data packet is not a G-PDU packet and the process of improving QoS in the wireless network is ended at block 218. At block 208, the G-PDU packet is de-capsulated if the received data packet is a G-PDU packet. At block 210, the de-capsulated G-PDU packet is sent to a differential QoS EPS bearer module for improving QoS in the wireless network. This is explained in more detail with reference to FIGS. 3 and 4. At block 212, the de-capsulated G-PDU packet is routed and filtered. At block 214, the routed and filtered G-PDU packet is en-capsulated. At block 216, the en-capsulated G-PDU packet is sent to the BP protocol engine. At block 218, the process of improving QoS in the wireless network is ended.

Figure 3:
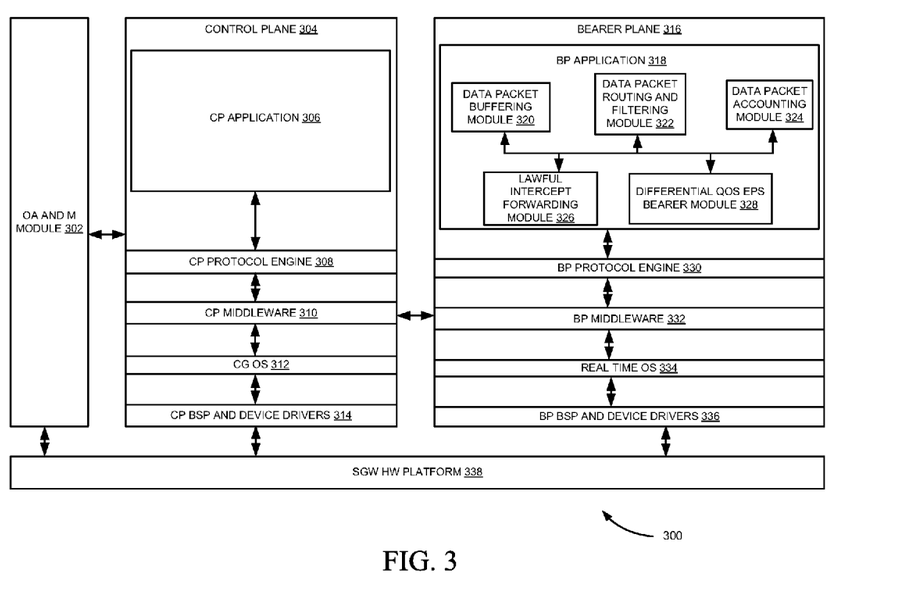
FIG. 3 illustrates a block diagram of an improved service gateway (SGW) architecture including a differential QoS evolved packet service (EPS) bearer module for improving QoS in the wireless network, using the processes shown in FIGS. 1 and 2, according to one embodiment.

Referring now to FIG. 3, which illustrates a block diagram of an improved service gateway (SGW) architecture 300 including a differential QoS EPS bearer module 328 for improving QoS in the wireless network, using the processes shown in FIGS. 1 and 2, according to one embodiment. As shown in FIG. 3, the improved SGW architecture 300 includes an operations, administration and management (OA and M) module 302, a control plane (CP) 304, a bearer plane (BP) 316 and a service gateway (SGW) hardware (HW) platform 338. In one embodiment, the SGW HW platform 338 refers to physical components in the improved SGW architecture 300. The OA and M module 302 includes processes, activities, tools, standards and the like associated with operating, administering, managing and maintaining of the improved SGW architecture 300.

Further as shown in FIG. 3, the CP 304 includes a CP application 306, a CP protocol engine 308, CP middleware 310, a carrier grade (CG) operating system (OS) 312 and CP board support package (BSP) and device drivers 314. The CP application 306 is responsible for various operations performed upon the acceptance of an incoming call through the final disposition of the call. The CP protocol engine 308 handles control protocol packets, such as general packet radio service tunneling protocol control plane (GTP-C) packets, and the like based on current state of the CP protocol engine 308. The CG OS 312 is a set of instructions that manages hardware resources and provides common services for execution of various applications based on specifications with detail standards of availability, scalability, manageability, and service response characteristics.

Furthermore as shown in FIG. 3, the BP 316 includes a BP application 318, a BP protocol engine 330, BP middleware 332, a real time OS 334 and BP BSP and device drivers 336. The CP BSP and device drivers 314 and the BP BSP and device drivers 336 include implementation specific support instructions for a given board that conforms to a given OS. The real time OS 334 is intended to serve real-time application requests. In addition, the BP application 318 includes a data packet buffering module 320, a data packet routing and filtering module 322, a data packet accounting module 324, a lawful intercept forwarding module 326, and the differential QoS EPS bearer module 328.

In addition as shown in FIG. 3, the SGW HW platform 338 is coupled to the OA and M module 302, the CP 304 and the BP 316. Also, the OA and M module 302 is coupled to the CP 304. Moreover, the CP 304 is coupled to the BP 316. In context, the CP middleware 310 is coupled to the BP middleware 332. Further as shown in FIG. 3, the CP BSP and device drivers 314 is coupled to the CG OS 312 and the CG OS 312 is coupled to the CP middleware 310. Furthermore, the CP middleware 310 is coupled to the CP protocol engine 308. Also, the CP protocol engine is coupled to the CP application 306.

Moreover as shown in FIG. 3, the BP BSP and device drivers 336 is coupled to the real time OS 334. Further, the real time OS 334 is coupled to the BP middleware 332. Furthermore, the BP middleware 332 is coupled to the BP protocol engine 330. In addition, the BP protocol engine 330 is coupled to the BP application 318. Moreover, in the BP application 318, the data packet buffering module 320, the lawful intercept forwarding module 326, the data packet routing and filtering module 322, the data packet accounting module 324, and the differential QoS EPS bearer module 328 are communicatively coupled with each other.

In operation, bearer connection context parameters, of a plurality of data packets, received from subscribers in the wireless network, are retrieved during a default EPS bearer or a dedicated EPS bearer setup. Further, the SGW HW platform 338 collects a plurality of data packets from a wireless network interface, such as a Gigabit Ethernet and the like. Furthermore, the CP 304 establishes a signaling connection between subscribers and the wireless network using services of the CP application 306, CP protocol engine 308, CP middleware 310, CG OS 312, and CP BSP and device drivers 314. In one exemplary implementation, bearer connection context parameters of each of the plurality of data packets are obtained by the CP 304 for establishing the signaling connection between the subscribers and the wireless network using services of the CP application 306, CP protocol engine 308, CP middleware 310, CG OS 312, and CP BSP and device drivers 314.

In addition, the BP 316 performs data packet processing for each of the plurality of data packets. In one embodiment, the plurality of data packets is being forwarded to BP middleware 332 in the BP 316 using the services of the BP BSP device drivers 336 and the real time OS 334. The BP middleware 332 then performs IP level data packet processing. The BP middleware 332 then sends the plurality of data packets to the BP protocol engine 330 for application level, such as general packet radio service tunneling protocol user plane (GTP-U) data packet processing. The BP protocol engine 330 then sends the plurality of data packets to the bearer application 318 for improving QoS in the wireless network. Particularly, the BP protocol engine 330 sends the plurality of data packets to the differential QoS EPS bearer module 328 in the BP application 318 for improving QoS in the wireless network. In one embodiment, the bearer connection context parameters of each of the plurality of data packets are obtained by the BP middleware 332 via the CP middleware 310. In one exemplary implementation, the differential QoS EPS bearer module 328 in the BP application 318 obtains the bearer connection context parameters. This is explained in more detail with reference to FIG. 4. The plurality of data packets are then sent to the data packet routing and filtering module 322 to route and filter the plurality of data packets.

Furthermore in operation, the plurality of data packets is sent to the data packet accounting module 324 to generate accounting information, such as number of data packets sent, number of data packets received, number of data packets lost, packet delay and the like of each of the plurality of data packets. In addition, the plurality of data packets is sent to the lawful intercept forwarding module 326 to capture and forwards the plurality of data packets coming from the wireless network interface to a lawful authority for analysis and/or evidence purposes. Also, the plurality of data packets is sent to the data packet buffering module 320 to buffer the plurality of data packets. The plurality of data packets is then sent to the BP protocol engine 330 for the GTP-U data packet processing. The plurality of data packets is then sent to the BP middleware 332 to perform entire IP level packet processing. Moreover, the plurality of data packets is sent back to the wireless network interface via the SGW HW platform 338.

Figure 4:
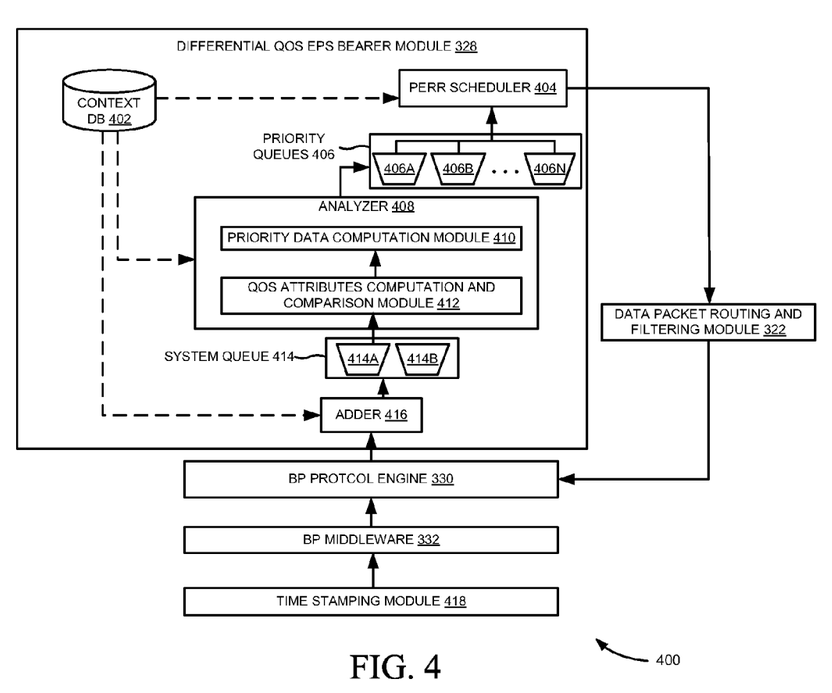
FIG. 4 illustrates various components included in the differential QoS EPS bearer module, such as the one shown in FIG. 3, according to one embodiment.

Referring now to FIG. 4, which is a block diagram 400 that illustrates various components included in the differential QoS EPS bearer module 328, such as the one shown in FIG. 3, according to one embodiment. As shown in FIG. 4, the block diagram 400 includes a time stamping module 418, the BP middleware 332, the BP protocol engine 330, the differential QoS EPS bearer module 328, and the data packet routing and filtering module 322. Further as shown in FIG. 4, the differential QoS EPS bearer module 328 includes a context DB 402, a pre-emption round robin (PERR) scheduler 404, one or more priority queues 406A-N, an analyzer 408, a system queue 414, and an adder 416. Furthermore as shown in FIG. 4, the system queue 414 includes a non-signaling queue 414A and a signaling queue 414B. In addition, the analyzer 408 includes a QoS attributes computation and comparison module 412 and a priority data computation module 410.

Moreover as shown in FIG. 4, the time stamping module 418 is coupled to the BP middleware 332. Also, the BP middleware 332 is coupled to the BP protocol engine 330. Further, the BP protocol engine 330 is coupled to the differential QoS EPS bearer module 328. Furthermore, the data packet routing and filtering module 322 is coupled between the differential QoS EPS bearer module 328 and the BP protocol engine 330. Particularly, the data packet routing and filtering module 322 is coupled between the PERR scheduler 404 and the BP protocol engine 330.

In addition as shown in FIG. 4, the adder 416 is coupled to the context DB 402 and the system queue 414. In addition, the non-signaling queue 414A is coupled to the analyzer 408. Particularly, the non-signaling queue 414A is coupled to the QoS attributes computation and comparison module 412 in the analyzer 408. Further, the QoS attributes computation and comparison module 410 is coupled to the priority data computation module 410. Also, the analyzer 408 is coupled to the one or more priority queues 406A-N and the context DB 402. Moreover, the PERR scheduler 404 is coupled to the context DB 402, the one or more priority queues 406A-N, and the data packet routing and filtering module 322.

In operation, the time stamping module 418 tags entry timestamp for each data packet received by a SGW from the wireless network interface and tags exit timestamp for each data packet sent to the wireless network interface by the SGW. In one embodiment, the BP middleware 332 receives the plurality of data packets from the SGW HW platform 338, such as the one shown in FIG. 3. The BP middleware 332 then performs the IP level data packet processing for each of the plurality of data packets. Further, the BP middleware 332 sends the plurality of data packets to the BP protocol engine 330 for the GTP-U data packet processing. In addition, the BP protocol engine 330 sends the plurality of data packets to the differential QoS EPS bearer module 328 for improving QoS in the wireless network.

Further in operation, the differential QoS EPS bearer module 328 obtains the bearer connection context parameters of each of the plurality of data packets. Furthermore, the adder 416 determines G-PDU packets in the received plurality of data packets based on first bearer connection context parameters which is a of the bearer connection context parameters. Exemplary first bearer connection context parameters include a TEID and the like. In one embodiment, first bearer connection context parameters are retrieved from the context DB 402. The adder 416 then queues the plurality of data packets in the system queue 414. Particularly, the adder 416 queues the determined G-PDU packets in the non-signaling queue 414A. This is explained in more detail with reference to FIG. 6.

In addition, the QoS attributes computation and comparison module 412 computes QoS attributes, such as latency, an average throughput, an aggregate throughput and the like for each of the queued G-PDU packets using throughput parameters and second bearer connection context parameters which is a subset of the bearer connection context parameters of each of the queued G-PDU packets. The second bearer connection context parameters of each of the queued G-PDU packets are retrieved from the context DB 402. Exemplary second bearer connection context parameters include a PCI, a PL, an APN-AMBR, a GBR, a MBR and the like. For example, the throughput parameters include parameters, such as an entry timestamp, an exit timestamp, a size of a TPDU of each G-PDU packet.

In one embodiment, the latency of each of the plurality of data packets is calculated by taking the difference of entry timestamp and exit time stamp associated with one or more previous G-PDU packets. Further, the average throughput of each of the plurality of dedicated EPS bearer data packets is computed by taking the ratio of average packet size and simultaneous exit time stamp differences associated with one or more previous G-PDU packets. Furthermore, the aggregate throughput of each of the plurality of default EPS bearer data packets is computed by taking the sum of the ratio of average packet size and simultaneous exit time stamp differences associated with one or more previous G-PDU packets. The QoS attributes computation and comparison module 410 then compares each of the QoS attributes with an associated predetermined QoS attribute.

Moreover, the priority data computation module 410 computes priority data for each of the queued G-PDU packets based on the comparison. The analyzer 408 then forms the one or more priority queues 406A-N based on the computed priority data of each of the queued G-PDU packets for improving QoS in the wireless network. This is explained in more detail with reference to FIG. 7. Also, the PERR scheduler 404 schedules each of the queued G-PDU packets in each of the formed one or more priority queues 406A-N based on third bearer connection context parameters which is a subset of the bearer connection context parameters for further improving the QoS in the wireless network. The third bearer connection context parameters of each of the queued G-PDU data packets are retrieved from the context DB 402. Exemplary third bearer connection context parameters include a PL, a PCI, a PVI and the like. This is explained in more detail with reference to FIG. 8. The PERR scheduler 404 then sends the scheduled G-PDU packets to the data packet routing and filtering module 322. The data packet routing and filtering module 322 then filters and routes the scheduled G-PDU packets and sends the filtered and routed G-PDU packets to the wireless network via the BP protocol engine 330.

Figure 5:
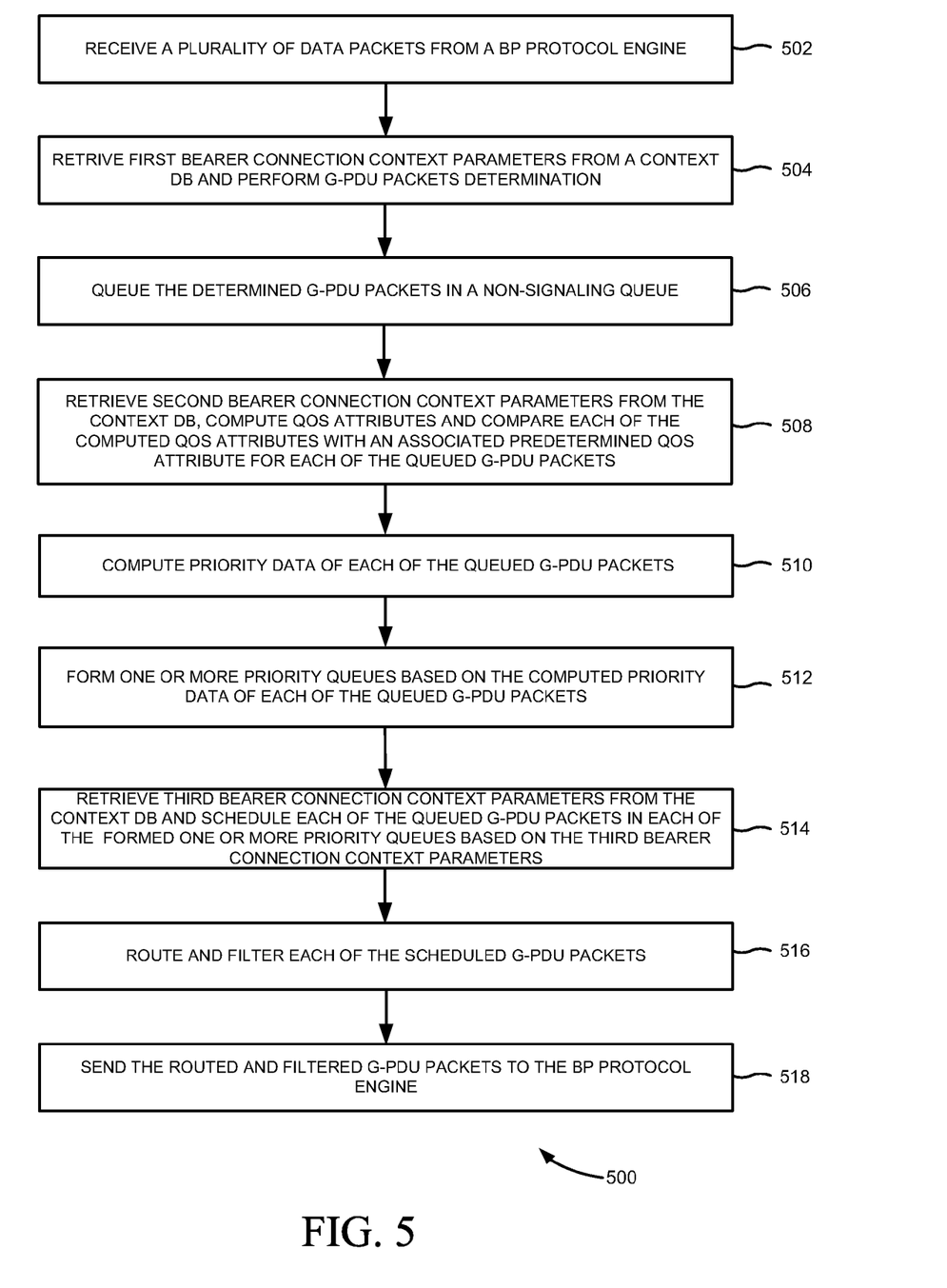
FIG. 5 illustrates yet another flowchart of a method for improving QoS in the wireless network, according to one embodiment.

Referring now to FIG. 5, which is yet another flowchart 500 that illustrates a method for improving QoS in a wireless network, according to one embodiment. At block 502, a plurality of data packets is received from a BP protocol engine. At block 504, first bearer connection context parameters which is a subset of bearer connection context parameters, such as a TEID and the like are retrieved from a context DB and G-PDU packets determination is performed. At block 506, the determined G-PDU packets are queued in a system queue. This is explained in more detail with reference to FIG. 6.

At block 508, second bearer connection context parameters which is a subset of the bearer connection context parameters, such as a PCI, a PL, an APN-AMBR, a GBR, a MBR and the like of each of the queued G-PDU packets are retrieved from the context DB and QoS attributes for each of the queued G-PDU packets are then computed using throughput parameters, such as an entry timestamp, an exit timestamp, a size of a T-PDU of each G-PDU packet and the second bearer connection context parameters. For example, the QoS attributes includes attributes, such as latency, an average throughput, an aggregate throughput and the like. The each of the computed QoS attributes is then compared with an associated predetermined QoS attribute. This is explained in more detail with reference to FIG. 4.

At block 510, priority data of each of the queued of the G-PDU packets is computed based on the QoS attributes comparison. At block 512, one or more priority queues are formed based on the computed priority data. This is explained in more detail with reference to FIG. 7. At block 514, third bearer connection context parameters which is a subset of the bearer connection context parameters, such as the PL the PCI, the PVI and the like are retrieved from the context DB and each of the G-PDU packets in the formed one or more priority queues is scheduled based on the third bearer connection context parameters. At block 516, each of the G-PDU packets is routed and filtered. At block 518, the routed and filtered G-PDU packets are sent to the BP protocol engine.

Figure 6:
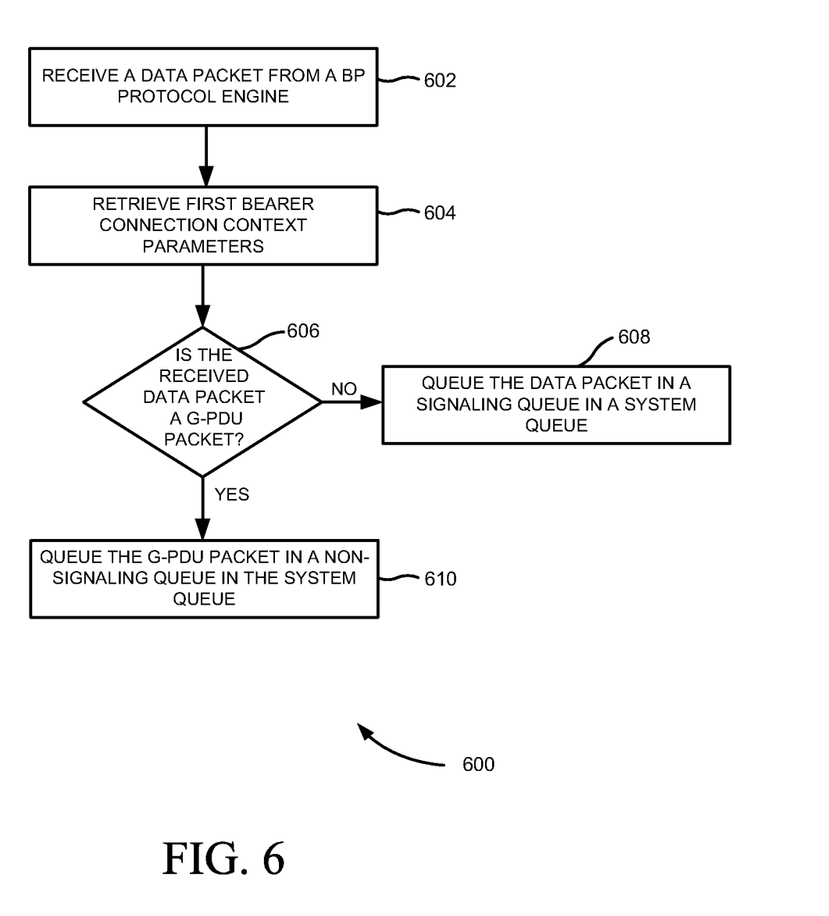
FIG. 6 illustrates a flowchart of functionalities of an adder in the differential QoS EPS bearer module, such as the one shown in FIG. 4, according to one embodiment.

Referring now to FIG. 6, which is a flowchart 600 that illustrates functionalities of an adder in a differential QoS EPS bearer module, such as the one shown in FIG. 4, according to one embodiment. At block 602, a data packet is received from a BP protocol engine. At block 604, first bearer connection context parameters which is a subset of bearer connection context parameters are retrieved from a context DB. Exemplary first bearer connection context parameters include a TEID and the like. At block 606, it is determined whether the received data packet is a G-PDU packet based on the first bearer connection context parameters. At block 608, the data packet is queued in a signaling queue in a system queue if the received data packet is not a G-PDU packet. At block 610, the G-PDU packet is queued in a non-signaling queue in the system queue if the received data packet is a G-PDU packet.

Figure 7:
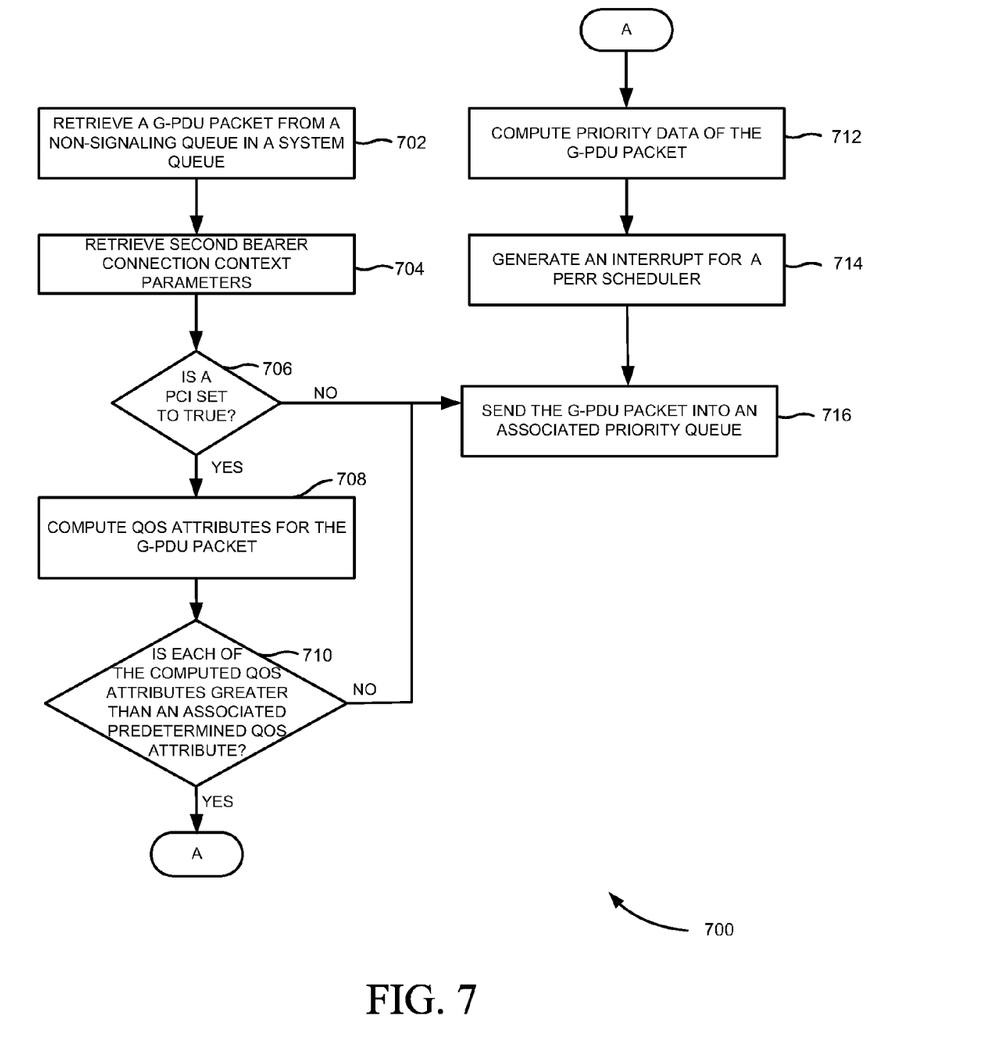
FIG. 7 illustrates a flowchart of functionalities of an analyzer in the differential QoS EPS bearer module, such as the one shown in FIG. 4, according to one embodiment.

Referring now to FIG. 7, which is a flowchart 700 that illustrates functionalities of an analyzer in a differential QoS EPS bearer module, such as the one shown in FIG. 4, according to one embodiment. At block 702, a G-PDU packet is retrieved from a non-signaling queue in a system queue. The G-PDU packet is queued in the non-signaling queue by an adder, as described with reference to FIG. 6. At block 704, second bearer connection context parameters which is a subset of bearer connection context parameters are retrieved from a context DB. Exemplary second bearer connection context parameters include a PCI, a PL, an APN-AMBR, a GBR, a MBR and the like. At block 706, it is determined whether one of the second bearer connection context parameters, such as a PCI is set to true. At block 716, the G-PDU packet is sent to an associated one of one or more priority queues if the PCI is not set to true.

At block 708, QoS attributes for the G-PDU packet are computed. At block 710, it is determined whether each of the computed QoS attributes is greater than an associated predetermined QoS attribute. At block 716, the G-PDU packet is sent to an associated priority queue if each of the computed QoS attributes is not greater than the associated predetermined QoS attribute. At block 712, a priority data of the G-PDU packet is computed if each of the computed QoS attributes is greater than the associated predetermined QoS attribute. In one exemplary implementation, priority data of the G-PDU packet is increased by a constant configuration factor if each of the computed QoS attributes is greater than the associated predetermined QoS attribute. At block 714, an interrupt is generated for a PERR scheduler. At block 716, the G-PDU packet is inserted into an associated priority queue.

Figure 8:
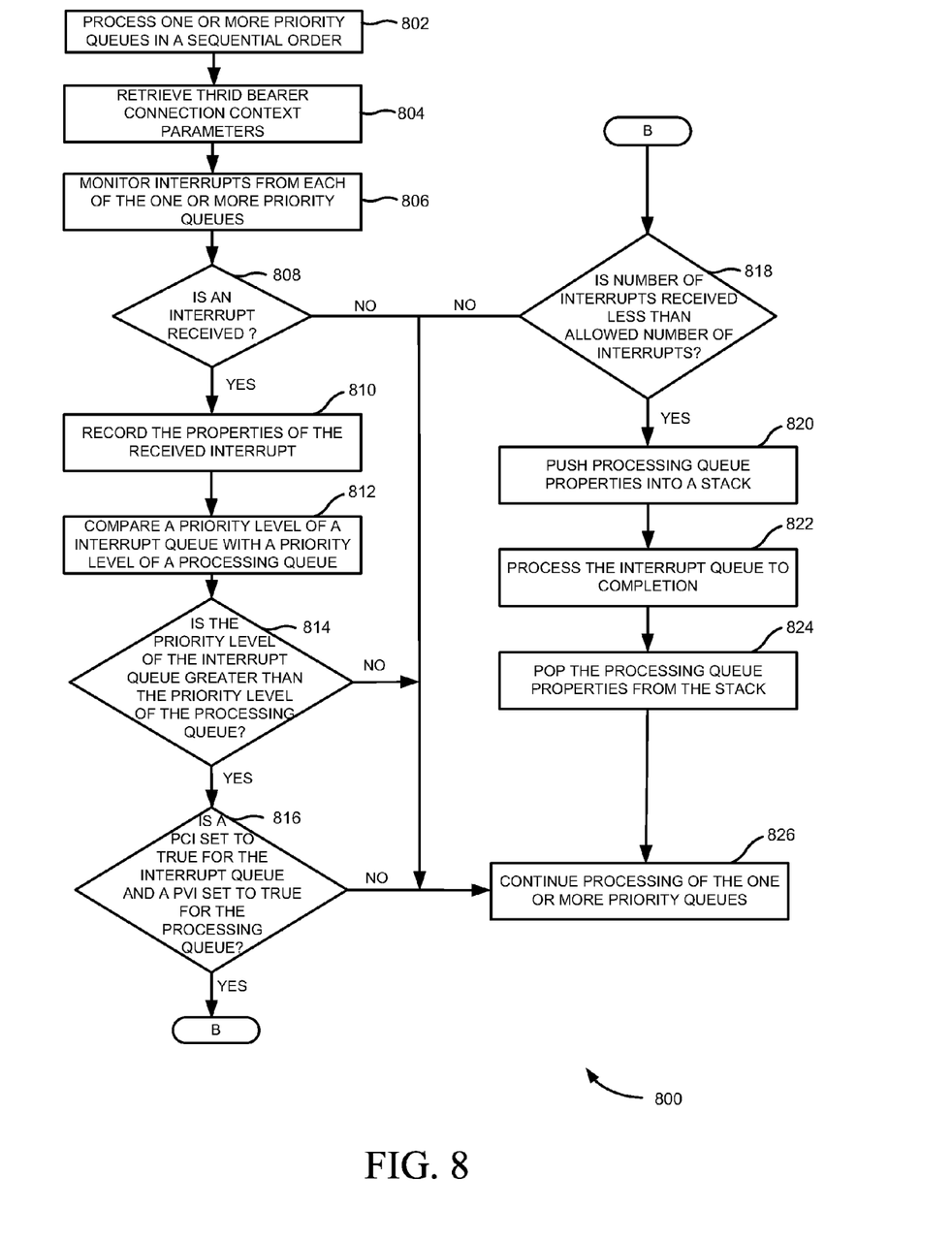
FIG. 8 illustrates a flowchart of functionalities of a pre-emption round robin (PERR) scheduler in the differential QoS EPS bearer module, such as the one shown in FIG. 4, according to one embodiment.

Referring now to FIG. 8, a flowchart 800 illustrates functionalities of a PERR scheduler in a differential QoS EPS bearer module, such as the one shown in FIG. 4, according to one embodiment. At block 802, one or more priority queues are processed in a sequential order. In this embodiment, the one or more priority queues are processed based on a priority associated with each of the one or more priority queues. As described with reference to FIG. 7, the G-PDU packet is queued in an associated one of the one or more priority queues. At block 804, third bearer connection context parameters which is a subset of bearer connection parameters are retrieved from context DB. Exemplary third bearer connection context parameters include a PL, a PCI, a PVI and the like. At block 806, interrupts generated from each of the one or more priority queues are monitored. At block 808, it is determined whether an interrupt is received from one of the plurality of priority queues. At block 826, processing of each of the one or more priority queues is continued if the interrupt is not received from the one or more priority queues. At block 810, properties of the received interrupt are recorded if the interrupt is received from the one or more priority queues.

At block 812, a PL of an interrupt queue is compared with a PL of a processing queue. In this embodiment, the one of the one or more priority queues generating the interrupt is referred to as the interrupt queue. At block 814, it is determined whether the PL of the interrupt queue is greater than the PL of the processing queue. At block 826, processing of the each of the one or more priority queues is continued if the priority level of the interrupt queue is not greater than the priority level of the processing queue. At block 816, it is determined whether a PCI is set to true for the interrupt queue and a PVI is set to true for the processing queue if the PL of the interrupt queue is not greater than the PL of the processing queue. At block 826, processing of the each of the one or more priority queues is continued if the PCI is not true for the interrupt queue and the PVI is not true for the processing queue.

At block 818, it is determined whether a number of interrupts received is less than an allowed number of interrupts if the PCI is true for the interrupt queue and the PVI is true for the processing queue. The third bearer connection context parameters are retrieved from a context DB. At block 826, processing of the each of the one or more priority queues is continued if the number of interrupts received is not less than the allowed number of interrupts. At block 820, properties of the processing queue are pushed into a stack if the number of interrupts received is less than the allowed number of interrupts.

At block 822, the interrupt queue is processed to completion. At block 824, the properties of the processing queue are popped from the stack. In operation, properties associated with a current queue, such as the processing queue are stored in a stack and a new interrupt queue, such as the interrupt queue is processed to completion. Further, once the new interrupt queue processing is done, the PERR scheduler resumes the current queue processing after retrieving the properties associated with the current queue from the stack. At block 826, processing of the one or more priority queues is continued.

In various embodiments, systems and methods described with reference to FIGS. 1 through 8 propose the improved SGW architecture including the differential QoS EPS bearer module for improving the QoS in the wireless network. Further, the differential QoS EPS bearer module is a standalone module in the improved SGW architecture which learns the $3^{rd}$ generation partnership project (3GPP) standard QoS parameters from protocol message flows and can interwork with packet data network (PDN) gateway (GW). Furthermore, the differential QoS EPS bearer module can be turned on and off depending on PDN GW's dynamic behavior or operator's initial static configuration.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for improving quality of service (QoS) in a wireless network, comprising:
    obtaining bearer connection context parameters of each of a plurality of data packets in the wireless network;
    determining general packet radio service tunneling protocol user plane protocol data unit (G-PDU) packets in the plurality of data packets based on first bearer connection context parameters which is a subset of the bearer connection context parameters;
    queuing the determined G-PDU packets in a non-signaling queue;
    computing QoS attributes for each of the queued G-PDU packets using throughput parameters and second bearer connection context parameters which is a subset of the bearer connection context parameters of each of the queued G-PDU packets;
    computing priority data for each of the queued G-PDU packets using the computed QoS attributes; and
    forming one or more priority queues based on the computed priority data of each of the queued G-PDU packets for improving QoS in the wireless network.

2. The method of claim 1, further comprising:
    scheduling each of the queued G-PDU packets in each of the formed one or more priority queues based on third bearer connection context parameters which is a subset of the bearer connection context parameters for further improving the QoS in the wireless network.

3. The method of claim 1, further comprising:
    receiving the plurality of data packets from subscribers in the wireless network.

4. The method of claim 1, wherein the plurality of data packets comprises data packets selected from the group consisting of a plurality of default bearer data packets and a plurality of dedicated bearer data packets.

5. The method of claim 4, wherein obtaining the bearer connection context parameters of each of the plurality of data packets comprises:
    obtaining default bearer connection context parameters of each of the plurality of default bearer data packets; and
    obtaining dedicated bearer connection context parameters of each of the plurality of dedicated bearer data packets.

6. The method of claim 5, wherein the default bearer connection context parameters comprise parameters selected from the group consisting of a priority level (PL), a pre-emption capability (PCI), a pre-emption vulnerability (PVI), a tunnel end point identifier (TEID) and an access point name-aggregate maximum bit rate (APN-AMBR).

7. The method of claim 5, wherein the dedicated bearer connection context parameters comprise parameters selected from the group consisting of a PL, a PCI, a PVI, a TEID, a maximum bit rate (MBR) for uplink, a MBR for downlink, a guaranteed bit rate (GBR) for uplink and a GBR for downlink.

8. The method of claim 1, wherein computing the priority data for each of the queued G-PDU packets using the computed QoS attributes comprises:
    comparing each of the computed QoS attributes of each of the queued G-PDU packets with an associated predetermined QoS attribute; and
    computing the priority data for each of the queued G-PDU packets based on the comparison.

9. The method of claim 8, wherein the QoS attributes comprise attributes selected from the group consisting of latency, an average throughput and an aggregate throughput.

10. The method of claim 1, wherein the throughput parameters comprise parameters selected from the group consisting of an entry timestamp, an exit timestamp, and a size of a transport protocol data unit (T-PDU) of each G-PDU packet.

11. A system for improving quality of service (QoS) in a wireless network, comprising:
    a differential QoS evolved packet service (EPS) bearer module, wherein the differential QoS EPS bearer module comprises:
    an adder;
    a system queue coupled to the adder, wherein the system queue comprises a non-signaling queue;
    an analyzer coupled to the non-signaling queue, wherein the analyzer comprises a QoS attributes computation and comparison module and a priority data computation module coupled to the QoS attributes computation and comparison module; and
    one or more priority queues coupled to the analyzer,
    wherein the differential QoS EPS bearer module obtains bearer connection context parameters of each of a plurality of data packets in the wireless network, wherein the adder determines general packet radio service tunneling protocol user plane protocol data unit (G-PDU) packets in the plurality of data packets based on first bearer connection context parameters which is a subset of the bearer connection context parameters, wherein the adder queues the determined G-PDU packets in the non-signaling queue, wherein the QoS attributes computation and comparison module computes QoS attributes for each of the queued G-PDU packets using throughput parameters and second bearer connection context parameters which is a subset of the bearer connection context parameters of each of the queued G-PDU packets, wherein the priority data computation module computes priority data for each of the queued G-PDU packets using the computed QoS attributes, and wherein the analyzer forms the one or more priority queues based on the computed priority data of each of the queued G-PDU packets for improving QoS in the wireless network.

12. The system of claim 11, further comprises a pre-emption round robin (PERR) scheduler coupled to the one or more priority queues, wherein the PERR scheduler schedules each of the queued G-PDU packets in each of the formed one or more priority queues based on third bearer connection context parameters which is a subset of the bearer connection context parameters for further improving the QoS in the wireless network.

13. The system of claim 11, further comprises a bearer plane (BP) protocol engine coupled to the differential QoS EPS bearer module, wherein the BP protocol engine receives the plurality of data packets from subscribers in the wireless network.

14. The system of claim 11, wherein the plurality of data packets comprises data packets selected from the group consisting of a plurality of default bearer data packets and a plurality of dedicated bearer data packets.

15. The system of claim 14, wherein the differential QoS EPS bearer module is configured to:
obtain default bearer connection context parameters of each of the plurality of default bearer data packets; and
obtain dedicated bearer connection context parameters of each of the plurality of dedicated bearer data packets.

16. The system of claim 15, wherein the default bearer connection context parameters comprise parameters selected from the group consisting of a priority level (PL), a pre-emption capability (PCI), a pre-emption vulnerability (PVI), a tunnel end point identifier (TEID) and an access point name-aggregate maximum bit rate (APN-AMBR).

17. The system of claim 15, wherein the dedicated bearer connection context parameters comprise parameters selected from the group consisting of a PL, a PCI, a PVI, a TEID, a maximum bit rate (MBR) for uplink, a MBR for downlink, a guaranteed bit rate (GBR) for uplink and a GBR for downlink.

18. The system of claim 11, wherein the QoS attributes computation and comparison module is further configured to compare each of the computed QoS attributes of each of the queued G-PDU packets with an associated predetermined QoS attribute.

19. The system of claim 18, wherein the priority data computation module is configured to compute the priority data for each of the queued G-PDU packets based on the comparison.

20. The system of claim 11, wherein the QoS attributes comprise attributes selected from the group consisting of latency, an average throughput and an aggregate throughput.

21. The system of claim 11, wherein the throughput parameters comprise parameters selected from the group consisting of an entry timestamp, an exit timestamp, and a size of a transport protocol data unit (T-PDU) of each G-PDU packet.

22. A non-transitory computer-readable storage medium to improve quality of service (QoS) having instructions that, when executed by a computing device, cause the computing device to:
obtain bearer connection context parameters of each of a plurality of data packets in the wireless network;
determine general packet radio service tunneling protocol user plane protocol data unit (G-PDU) packets in the plurality of data packets based on first bearer connection context parameters which is a subset of the bearer connection context parameters;
queue the determined G-PDU packets in a non-signaling queue;
compute QoS attributes for each of the queued G-PDU packets using throughput parameters and second bearer connection context parameters which is a subset of the bearer connection context parameters of each of the queued G-PDU packets;
compute priority data for each of the queued G-PDU packets using the computed QoS attributes; and
form one or more priority queues based on the computed priority data of each of the queued G-PDU packets for improving QoS in the wireless network.

23. The non-transitory computer-readable storage medium of claim 22, further comprising:
scheduling each of the queued G-PDU packets in each of the formed one or more priority queues based on third bearer connection context parameters which is a subset of the bearer connection context parameters for further improving the QoS in the wireless network.

24. The non-transitory computer-readable storage medium of claim 22, further comprising:
receiving the plurality of data packets from subscribers in the wireless network.

25. The non-transitory computer-readable storage medium of claim 22, wherein the plurality of data packets comprises data packets selected from the group consisting of a plurality of default bearer data packets and a plurality of dedicated bearer data packets.

26. The non-transitory computer-readable storage medium of claim 25, wherein obtaining the bearer connection context parameters of each of the plurality of data packets comprises:
obtaining default bearer connection context parameters of each of the plurality of default bearer data packets; and
obtaining dedicated bearer connection context parameters of each of the plurality of dedicated bearer data packets.

27. The non-transitory computer-readable storage medium of claim 26, wherein the default bearer connection context parameters comprise parameters selected from the group consisting of a priority level (PL), a pre-emption capability (PCI), a pre-emption vulnerability (PVI), a tunnel end point identifier (TEID) and an access point name-aggregate maximum bit rate (APN-AMBR).

28. The non-transitory computer-readable storage medium of claim 26, wherein the dedicated bearer connection context parameters comprise parameters selected from the group consisting of a PL, a PCI, a PVI, a TEID, a maximum bit rate (MBR) for downlink, a guaranteed bit rate (GBR) for uplink and a GBR for downlink.

29. The non-transitory computer-readable storage medium of claim 22, wherein computing the priority data for each of the queued G-PDU packets using the computed QoS attributes comprises:
comparing each of the computed QoS attributes of each of the queued G-PDU packets with an associated predetermined QoS attribute; and
computing the priority data for each of the queued G-PDU packets based on the comparison.

30. The non-transitory computer-readable storage medium of claim 29, wherein the QoS attributes comprise attributes selected from the group consisting of latency, an average throughput and an aggregate throughput.

31. The non-transitory computer-readable storage medium of claim 22, wherein the throughput parameters comprise parameters selected from the group consisting of an entry timestamp, an exit timestamp, and a size of a transport protocol data unit (T-PDU) of each G-PDU packet.

* * * * *